United States Patent [19]

Ohmae et al.

[11] Patent Number: 4,859,710
[45] Date of Patent: Aug. 22, 1989

[54] LEAD ACCUMULATOR

[75] Inventors: Tadayuki Ohmae; Tadashi Sakurai; Noboru Yamaguchi; Mitsuyuki Okada; Kouichiro Asao, all of Chiba, Japan

[73] Assignee: Sumitomo Chemical Co., Limited, Osaka, Japan

[21] Appl. No.: 188,995

[22] Filed: May 2, 1988

[30] Foreign Application Priority Data

Jun. 26, 1987 [JP] Japan .................. 62-160246

[51] Int. Cl.⁴ .............................................. C08J 9/40
[52] U.S. Cl. ..................................... 521/55; 429/136; 429/204; 429/254; 521/149
[58] Field of Search ................. 521/55, 149; 429/254, 429/204, 136

[56] References Cited

U.S. PATENT DOCUMENTS 4,438,185 3/1984 Taskier .................................. 429/250
4,440,838 4/1984 SChmidt ............................. 429/254

FOREIGN PATENT DOCUMENTS 0044868 1/1981 European Pat. Off. .

OTHER PUBLICATIONS

Chemical Abstracts, vol. 95, No. 6, Aug. 10, 1981, Columbus, Ohio, U.S.A.

Primary Examiner—Morton Foelak
Attorney, Agent, or Firm—Sughrue, Mion, Zinn, McPeak & Seas

[57] ABSTRACT

A lead accumulator using dilute sulfuric acid as an electrolyte liquor is disclosed, in which the electrolyte liquor is fixed by absorption or impregnation into an ethylene copolymer resin or a molding thereof comprising from 40 to 90% by weight of an ethylene unit and from 10 to 60% by weight of at least one comonomer unit selected from (A) and ethylenically unsaturated comonomer unit having an amido group and an amino group in the molecule thereof and (B) an ethylenically unsaturated comonomer unit having an ester group and an amino group in the molecule thereof and having an average molecular weight of from 5,000 to 50,000. The lead accumulator can be produced easily and at a low cost without limitations of shape and volume and has high performance reliability.

10 Claims, 3 Drawing Sheets

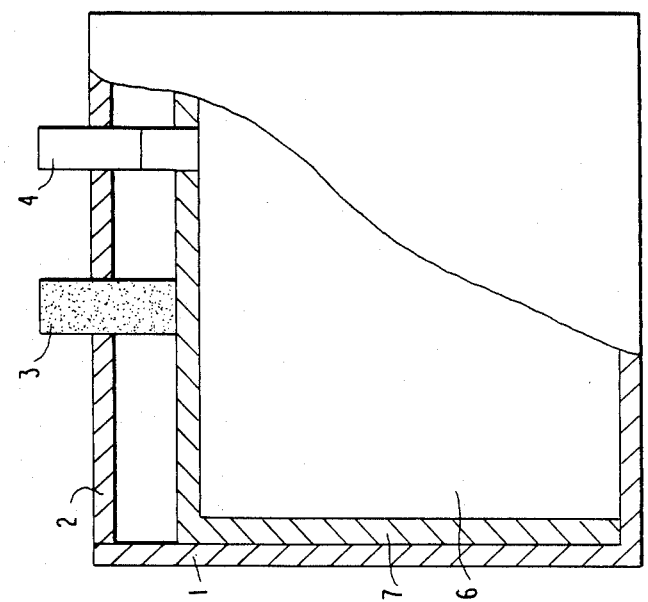
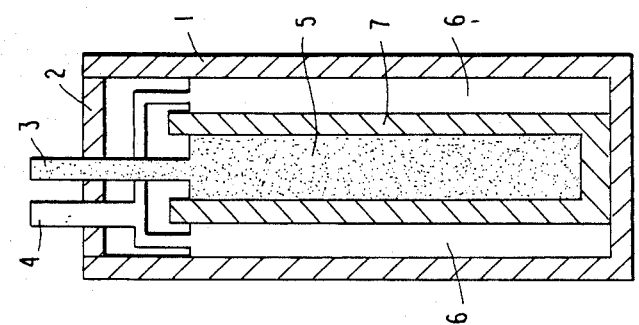

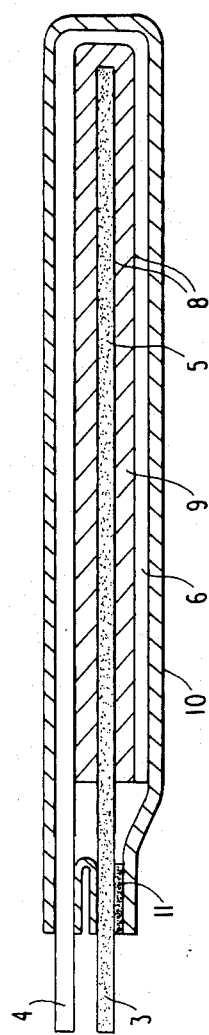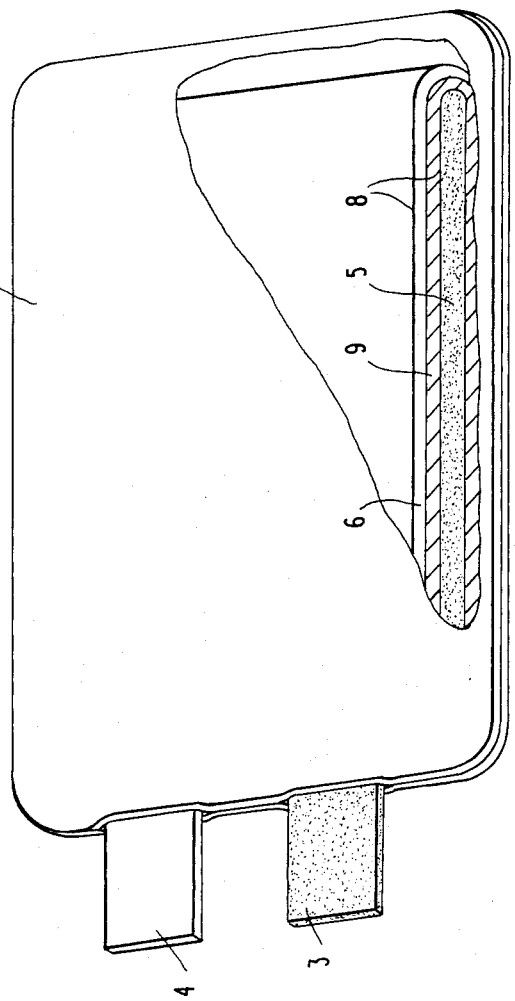

LEAD ACCUMULATOR

FIELD OF THE INVENTION

This invention relates to an improved lead accumulator, and more particularly a lead accumulator having either a small size as a power source for emergency use, a portable power source, etc. or a large size as a stationary battery, an auto battery, a battery for electrical cars, etc. The lead accumulator of this invention is also promising for application to electric power accumulation in combination with a solar battery.

BACKGROUND OF THE INVENTION

The conventional lead accumulators have many limitations in handling or transportation arising from the use of an electrolyte liquor, i.e., dilute sulfuric acid.

In order to solve this problem, various attempts have been made to fix the electrolyte liquor to make it non-fluid. For example, there have been proposed a glass fiber system composed of fine glass fibers each having an average diameter of about 1 μm having been impregnated with an electrolyte liquor and a gel system obtained by mixing an electrolyte liquor with a gelling agent, such as a silicon dioxide powder.

However, the above-described fine glass mat is expensive. Further, since it undergoes shrinkage during use to lose intimate contact with the grids, it is necessary that the mat should be assembled while being in a compressed state. In particular, when the mat is applied to a large-sized battery, an ascent of the electrolyte liquor toward the upper ends of anode and cathode grids is suppressed, resulting in deterioration of characteristics in the upper portion.

On the other hand, in the above-described gel system, it is difficult to uniformly gelatinize the electrolyte liquor with silicon dioxide which is generally used as a gelling agent. In order to improve the gelling properties, it has been proposed to use silicon dioxide in combination with a sulfate, e.g., sodium sulfate, as a gelling assistant as described in Japanese Patent Application (OPI) No. 267274/86 (the term "OPI" as used herein means "unexamined published Japanese patent application"). There has also been proposed a method comprising mixing a silicon dioxide powder and a synthetic resin powder, sinter-molding the mixed powder into a sheet, and adding sulfuric acid thereto to form a gel as described in Japanese Patent Application (OPI) No. 10858/87.

These proposals, however, are still unsatisfactory in view of limitations of shape and volume, economy, and the like. Therefore, it has been keenly demanded to develop an effective method for fixation of an electrolyte liquor for lead accumulators.

SUMMARY OF THE INVENTION

One object of this invention is to eliminate various problems associated with the conventional lead accumulators in which an electrolyte liquor is fixed and to provide a lead accumulator having high performance reliability which can be assembled easily and at low cost.

In the light of the above object, the inventors have conducted intensive and extensive researches on materials to be used for fixation of an electrolyte liquor. As a result, it has now been found that a copolymer comprising an ethylene unit and at least one ethylenically unsaturated comonomer unit having an amido or ester group and an amino group in the molecule thereof is capable of gelatinizing sulfuric acid while exhibiting satisfactory resistance to sulfuric acid and excellent receptivity to sulfuric acid and can easily be molded and fabricated, thus meeting the purpose of the present invention.

The present invention relates to a lead accumulator using dilute sulfuric acid as an electrolyte liquor, in which the electrolyte liquor is fixed by absorption or impregnation into an ethylene copolymer resin or a molding thereof comprising from 40 to 90% by weight of an ethylene unit and from 10 to 60% by weight of at least one comonomer unit selected from (A) an ethylenically unsaturated comonomer unit having an amido group and an amino group in the molecule thereof and (B) an ethylenically unsaturated comonomer unit having an ester group and an amino group in the molecule thereof and having an average molecular weight of from 5,000 to 50,000.

BRIEF DESCRIPTION OF THE ACCOMPANYING DRAWINGS

FIG. 1 illustrates a transverse section and a partial longitudinal section of a lead accumulator according to the present invention, in which an electrolyte liquor is fixed by absorption in a resin sheet.

FIG. 2 illustrates a transverse section and a partial longitudinal section of a lead accumulator according to the present invention, in which an electrolyte liquor is fixed by absorption and impregnation in a porous resin mat.

Figure 3B:
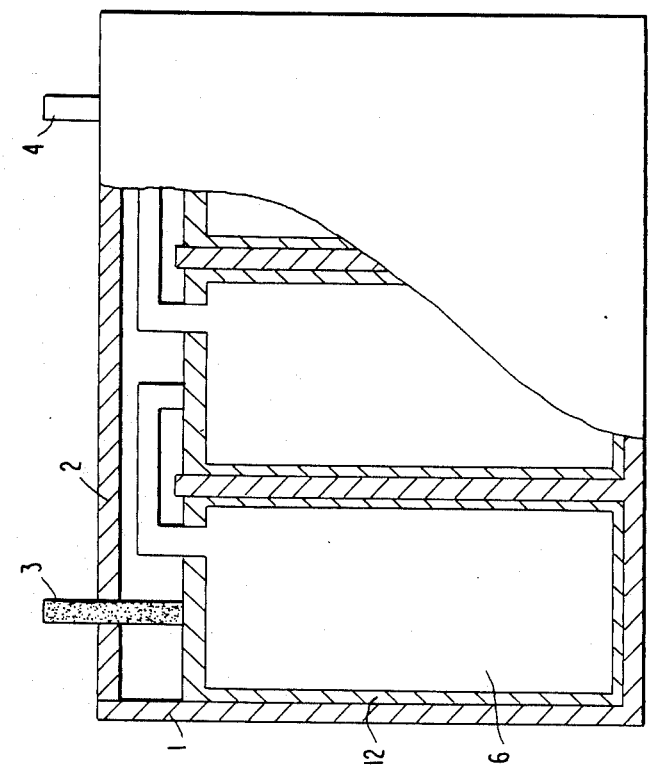
FIG. 3 illustrates a transverse section and a partial longitudinal section of a lead accumulator according to the present invention, in which an electrolyte liquor is fixed by absorption and impregnation in a resin powder.
Figure 3A:
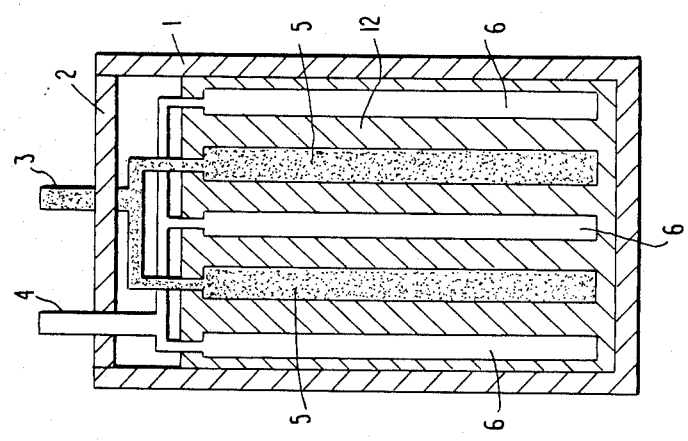

In FIGS. 1 to 3, the numerals have the following meanings.
1 Battery box
2 Battery top
3 Anode terminal
4 Cathode terminal
5 Anode grid
6 Cathode grid
7 Resin sheet having absorbed therein dilute sulfuric acid
8 Bag made of an ethylene copolymer resin film
9 Porous resin mat having absorbed therein dilute sulfuric acid
10 Polyethylene bag
11 Ethylene copolymer based adhesive
12 Resin powder having absorbed therein dilute sulfuric acid

DETAILED DESCRIPTION OF THE INVENTION

The ethylenically unsaturated comonomer unit (A) having an amido group and an amino group in the molecule thereof, which is used in the ethylene copolymer of the present invention, is a compound having both an amido group

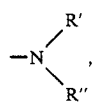

wherein R and R' each represents a hydrogen atom or an alkyl group having from 1 to 4 carbon atoms, or they are bonded to each other to form a heterocyclic ring together with the nitrogen atom per molecule. The amido group is preferably contained in the main chain, and the amino group is preferably contained in the terminal or side chain.

The comonomer unit (A) includes those derived from acrylamide derivatives represented by formula (I):

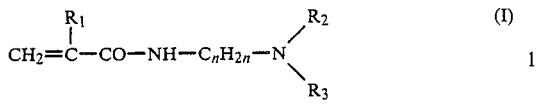

wherein $R_1$ represents a hydrogen atom or a methyl group; $R_2$ and $R_3$ each represents a hydrogen atom or an alkyl group having from 1 to 4 carbon atoms, or they are bonded to each other to form a heterocyclic ring together with the nitrogen atom (e.g.,

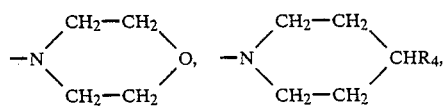

etc., wherein $R_4$ represents a hydrogen atom or an alkyl group having from 1 to 4 carbon atoms); and n represents an integer of from 2 to 5.

Specific and preferred examples of the acrylamide comonomers represented by formula (I) are dimethylaminoethylacrylamide, dimethylaminopropylacrylamide, dimethylaminobutylacrylamide, diethylaminoethylacrylamide, diethylaminopropylacrylamide, diethylaminobutylacrylamide, dipropylaminoethylacrylamide, dipropylaminopropylacrylamide, dipropylaminobutylacrylamide, N-(1,1-dimethyl-3-dimethylaminopropyl)acrylamide, N-(2-methyl-3-dimethylaminopropyl)acrylamide, etc.; methacrylamide derivatives corresponding to these acrylamide derivatives; and these acrylamide or methacrylamide derivatives wherein the two alkyl groups bonded to the nitrogen atom of the terminal amino group are bonded to each other to form a heterocyclic ring, and particularly a 6-membered heterocyclic ring, together with the nitrogen atom.

Of the above-enumerated comonomers, preferred are dimethylaminopropylacrylamide, dimethylaminopropylmethacrylamide, dimethylaminoethylacrylamide, and dimethylaminoethylmethacrylamide.

The ethylenically unsaturated comonomer unit (B) having an ester group and an amino group in the molecule thereof, which is used in the ethylene copolymer of the present invention, is a compound having both an ester group (—CO—O—) and an amino group

wherein R″ and R‴ each represents a hydrogen atom or an alkyl group having from 1 to 4 carbon atoms, or they are bonded to each other to form a heterocyclic ring together with the nitrogen atom per molecule. It is preferable that the ester group be contained in the main chain and the amino group be contained in the terminal or side chain.

The comonomer unit (B) includes those derived from acrylic esters represented by formula (II):

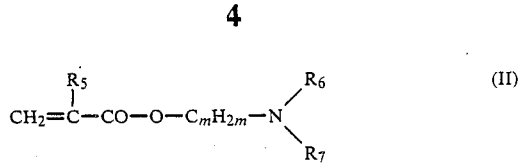

wherein $R_5$ represents a hydrogen atom or a methyl group; $R_6$ and $R_7$ each represents a hydrogen atom or an alkyl group having from 1 to 4 carbon atoms, or they are bonded to each other to form a heterocyclic ring (e.g.,

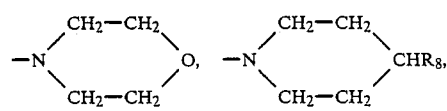

etc., wherein $R_8$ represents a hydrogen atom or an alkyl group having from 1 to 4 carbon atoms); and m represents an integer of from 2 to 5.

Specific and preferred examples of the acrylic ester comonomers represented by formula (II) include acrylic esters, e.g., aminomethyl acrylate, aminoethyl acrylate, amino-n-butyl acrylate, methylaminoethyl acrylate, ethylaminoethyl acrylate, ethylaminoisobutyl acrylate, isopropylaminomethyl acrylate, isopropylaminoethyl acrylate, n-butylacrylaminoethyl acrylate, t-butylaminoethyl acrylate, dimethylaminomethyl acrylate, dimethylaminoethyl acrylate, dimethylaminopropyl acrylate, dimethylamino-n-butyl acrylate, N-methyl-N-ethylaminoethyl acrylate, N-methyl-N-n-butylaminoethyl acrylate, diethylaminoethyl acrylate, diisopropylaminoethyl acrylate, di-n-propylamino-n-propyl acrylate, di-n-butylaminoethyl acrylate, di-n-butylamino-n-propyl acrylate, etc.; methacrylic esters corresponding to these acrylic esters; and these acrylic esters and methacrylic esters wherein the two alkyl groups bonded to the nitrogen atom in the terminal amino group are bonded to each other to form a heterocyclic ring, and particularly a 6-membered heterocyclic ring, together with the nitrogen atom.

Preferred of these acrylic and methacrylic ester comonomers are dimethylaminoethyl methacrylate, dimethylaminoethyl acrylate, dimethylaminopropyl methacrylate, and dimethylaminopropyl acrylate.

The content of at least one comonomer unit selected from the comonomer units (A) and (B) in the ethylene copolymer ranges from 10 to 60%, and preferably from 20 to 50%, by weight. If it is less than 10% by weight, the ethylene copolymer cannot sufficiently absorb sulfuric acid, thus failing to serve as a fixing carrier or gelling agent for sulfuric acid. On the other hand, if the comonomer unit content exceeds 60% by weight, the ethylene copolymer has too high absorptivity for sulfuric acid to retain its shape as a fixing carrier.

If desired, the ethylene copolymer according to the present invention may be a terpolymer or multi-component copolymer which further comprises one or more of other copolymerizable ethylneically unsaturated comonomers.

Specific and preferred examples of other ethylenically unsaturated comonomers which can be used in this invention include methyl acrylate, methyl methacrylate, ethyl acrylate, ethyl methacrylate, n-butyl acrylate, n-butyl methacrylate, glycidyl acrylate, glycidyl methacrylate, vinyl acetate, vinyl propionate, etc. Particularly preferred of them are methyl acrylate, methyl methacrylate, ethyl acrylate, and vinyl acetate.

The content of the ethylenically unsaturated comonomer unit in the ethylene copolymer should not exceed 20% by weight, and preferably not exceed 15% by weight.

The above-described ethylene copolymer may be used either individually or in combination of two or more thereof.

The ethylene copolymer has a number average molecular weight of from 5,000 to 50,000 ($[\eta]=0.29-1.23$), and preferably from 8,000 to 40,000 ($[\eta]=0.39-1.07$) as calculated from the intrinsic viscosity $[\eta]$ measured at 135° C. in a tetralin solution according to the following equation:

$$[\eta] = 1.35 \times 10^{-3} \overline{M}n^{0.63}$$

wherein $[\eta]$ is an intrinsic viscosity; and $\overline{M}n$ is a number average molecular weight [cf. I. Harris, *Journal of Polymer Science*, Vol. 8 (4), 353–364 (1952)].

If the $\overline{M}n$ of the ethylene copolymer exceeds 50,000, the melt fluidity of the resin itself becomes small to make molding difficult. Besides, the molding obtained therefrom does not sufficiently absorb sulfuric acid, failing to serve as a fixing carrier or gelling agent for sulfuric acid. If $\overline{M}n$ is less than 5,000, the resin molding suffers from shortage of mechanical strength, lacking in shape retention when impregnated with the sulfuric acid.

The term "dilute sulfuric acid" as used here means a sulfuric acid concentration of 90% or less.

The resin molding which can be used in the present invention can be obtained by molding the above-described ethylene copolymer by commonly employed molding processes for thermoplastic resins, such as extrusion molding, injection molding, press molding, and the like.

The shape of the molding is not particularly limited and includes, for example, films (inclusive of porous films), sheets (inclusive of porous sheets), tubes, fibers (inclusive of hollow fibers), nonwoven fabric, woven fabric, powders, etc. The fibers may be conjugate fibers with other resins, e.g., polypropylene, and the nonwoven and woven fabrics may be that obtained from such conjugate fibers. For example, core-sheath conjugate fibers comprising polypropylene as the core and the resin of the present invention as the sheath, parallel conjugate fibers composed of polypropylene and the resin of the invention, and woven fabric or nonwoven fabric obtained from these conjugate fibers can be employed to advantage.

These conjugate fibers can be prepared by the conjugate spinning methods and apparatus described, e.g., in Japanese Patent Publication Nos. 14900/69 and 24732/71, Japanese Patent Application (OPI) No. 2162/71, and Japanese Patent Publication Nos. 44773/79, 44774/79, 26209/80, 17807/80. and 483/80.

The porous films or sheets may be produced, for example, by a process comprising adding a fine powder of a compound soluble in water or an inorganic acid (e.g., sulfuric acid), such as sodium carbonate, sodium hydrogen carbonate, etc., to the resin, molding the compounded resin to form a film of sheet, and treating the film or sheet with water or an inorganic acid (e.g., sulfuric acid) to thereby dissolve and remove the powder contained to form voids.

The ethylene copolymer resin according to the present invention is capable of absorbing sulfuric acid in an amount of 2 to 8 times the weight of the resin. For instance, when a 0.5 mm thick sheet molded from an ethylene copolymer containing 43% by weight of a dimethylaminopropylacrylamide unit as comonomer (A) and having a number average molecular weight of 31,000 ($[\eta]=0.91$) is used, the pick-up of 40% sulfuric acid by immersion at 25° C. for 3 hours or at 60° C. for 1 hour is 3.5 times or 4.6 times the weight of the sheet, respectively. In this case, the sheet is swollen to a volume 3.2 times or 3.8 times the initial volume, respectively.

Accordingly, fixation of dilute sulfuric acid (an electrolyte liquor) can be achieved, for example, by interposing the above-illustrated resin sheet between grids and pouring an adequate amount of dilute sulfuric acid into the sheet to thereby impregnate the sulfuric acid in the sheet and swell the sheet. The thus nonfluidized electrolyte liquor can be prevented from separating from the grids.

In the case where a porous sheet obtained from the above resin is used, the sheet is swollen upon absorption of sulfuric acid to be thereby fixed between the grids and, at the same time, sulfuric acid can be taken up into the voids and held therein in a fixed state, thereby achieving fixation of a larger amount of sulfuric acid. As a result, a satisfactory contact between the grids and the electrolyte liquor can be assured during long-term use, and the resulting lead accumulator exhibits high performance reliability.

The similar effects can be produced in the case where a conjugate fiber composed of the above resin and polypropylene or woven fabric or a nonwoven mat obtained therefrom is used.

Powders of the above resin may also be charged between grids and installed in a battery box. In this case, the resin powder itself is swollen upon pouring sulfuric acid therein and, at the same time, the sulfuric acid can be held among resin particles.

Further, it is also possible that the resin is mixed with sulfuric acid, and the mixture is heated at a temperature above the melting point of the resin while stirring to prepare a viscous fluid of the resin in a molten state in the sulfuric acid. The resulting viscous fluid is packed in a battery box and, after installation of grids, the fluid is cooled to produce a lead accumulator in which the electrolyte liquor is nonfluidized in the form of gel.

In these embodiments, an anode and/or a cathode may be wrapped in a film obtained from the resin of the present invention to prevent the active material from falling off during use. Prevention of falling of the active material would minimize a decrease of the active material in weight.

Furthermore, a porous sheet or mat made of the above resin or conjugate fibers composed of the resin and polypropylene may be combined with the above-described molten viscous fluid.

In the present invention, oxygen evolved from the anode may be absorbed in the cathode or returned to water by the action of a catalyst in a known manner. For the purpose of preventing sulfation or elution of lead from the grid, the electrolyte liquor can contain a sulfate, e.g., sodium sulfate, magnesium sulfate, etc.

As set for the above, an electrolyte liquor can be fixed by the use of the ethylene copolymer resin of the present invention and/or a molding prepared therefrom. Thus, a lead accumulator can be produced with freedom of design, and the resulting lead accumulator can be handled and transported with less restrictions of conditions.

For the purpose of improving heat resistance or absorptivity for an electrolyte liquor, the ethylene copolymer resin and/or a molding thereof to be used for fixation of an electrolyte liquor may be subjected to intermolecular crosslinking by irradiation with electron beams, gamma rays, ultraviolet rays, etc. or may be melt-kneaded with an organic peroxide, a diazo compound, etc., in various kinds of molding machines for thermoplastic resins.

The present invention is now illustrated in greater detail with reference to Examples and Reference Example, but it should be understood that the present invention is not deemed to be limited thereto. In these examples, all the percents are by weight unless otherwise indicated.

EXAMPLE 1

An ethylene copolymer containing 57% of an ethylene unit and 43% of a dimethylaminopropylacrylamide unit and having a number average molecular weight of 31,000 ($[\eta]=0.91$) was extrusion molded in an extruder having a diameter of 20 mm to prepare a sheeting of 9 cm in width and 0.5 mm in thickness.

A 8 cm×12 cm sample piece was cut out of the sheeting and immersed in 40% dilute sulfuric acid at 60° C. for 1 hour to obtain an impregnated resin sheet 13.0 cm wide, 18.8 cm long, and 0.75 mm thick having absorbed therein 40% sulfuric acid in an amount 4.6 times the initial weight of the resin sheet.

As shown in FIG. 1, an anode grid 5 of 10 cm in width, 8 cm in height, and 2 mm in thickness previously having a sulfuric acid radical was covered with the above-prepared impregnated resin sheet 7, and cathode grids 6 of 10 cm in width, 8 cm in height, and 0.5 mm in thickness were laminated on the both sides thereof. The grid unit was installed in a battery box 1. After initial charging, there was obtained a lead accumulator having a fixed electrolyte liquor.

The resulting lead accumulator had an electromotive force (EMF) of 2V and a capacity of 1.8 Ah at a discharging rate of 10 hours.

EXAMPLE 2

The same ethylene copolymer as used in Example 1 was spun into filaments having an average diameter of 90 μm, and the filaments were processed to prepare a nonwoven fabric (porous mat) having a density of 0.4 g/cm³, a void of 60% by volume, and a thickness of 2 mm. A 15 cm×20 cm piece was cut out of the porous mat and assembled into an envelope type lead accumulator as shown in FIG. 2. That is, each of an anode grid 5 of 15 cm in width, 10 cm in length, and 0.5 mm in thickness and a cathode grid 6 of 15 cm in width, 20.5 cm in length, and 0.2 mm in thickness was covered with a 50 μm thick film 8 prepared from the same ethylene copolymer resin as used in Example 1 so as to prevent the active material from falling off. The above-prepared porous mat 9 was placed so as to cover the anode grid 5, and the cathode grids 6 were then laminated on the both sides thereof. The laminate was wrapped by a 150 μm thick polyethylene film 10. Into the porous mat 9 was poured 120 g of 40% sulfuric acid. A film 11 of Bondfast ® 7B (a trade name of an ethylene copolymer adhesive made by Sumitomo Chemical Co., Ltd.) was inserted into the opening, from which an anode terminal 3 and a cathode terminal 4 were projected, and heat bonded to seal the polyethylene bag. The sulfuric acid was absorbed in the resin and, at the same time, impregnated into the voids and thus fixed. An envelope type lead accumulator of FIG. 2 was completed by initial charging.

The resulting lead accumulator had an EMF of 2V and a capacity of 13 Ah at a 10-hour discharging rate.

EXAMPLES 3 TO 6

Each of ethylene copolymers shown in Table 1 was cooled with dry ice and ground in a grinder. The resulting resin powder was mixed with 40% sulfuric acid at 25° C. at a mixing ratio shown in Table 1. The resulting mixture was poured into a battery box 1 of FIG. 3 which was divided into three chambers each having a width of 2 cm, a length of 3 cm, and a height of 3.5 cm.

Three cathode grids 6 each having a width of 2.8 cm, a height of 2.5 cm, and a thickness of 1.8 mm which were connected at their top ends and two anode grids 5 each having a width of 2.8 cm, a height of 2.5 mm, and a thickness of 2.5 mm which were connected at their top ends were installed into each chamber in such a manner that an anode grid and a cathode grid alternated with each other at an interval of 2.4 mm.

The mixture of the resin powder and dilute sulfuric acid ascended through the space between each two grids to the upper ends of the grids. Within 10 minutes from the pouring, the sulfuric acid was absorbed into the resin powder and, at the same time, held in gaps among the resin powders. The thus fixed electrolyte liquor is indicated as numeral 12 in FIG. 3.

After the box 1 was sealed with a top 2, initial charging was conducted to produce a lead accumulator. The EMF and capacity (10-hour discharging rate) of each lead accumulator are shown in Table 1.

TABLE 1

| Example No. | Comonomer Unit (I) (Content: wt %) | Comonomer Unit (II) (Content: wt %) | (I) + (II) (wt %) | Molecular Weight Mn | Molecular Weight $[\eta]$ | Mixing Ratio* | Discharge Performance EMF (V) | Discharge Performance Capacity** (Ah) |
|---|---|---|---|---|---|---|---|---|
| 3 | Dimethylamino-propylacrylamide (22) | — | 22 | 8700 | 0.40 | 1/4.5 | 6 | 1.0 |
| 4 | " (25) | Dimethylamino-ethyl methacrylate (14) | 39 | 24200 | 0.78 | 1/5.5 | 6 | 1.1 |
| 5 | " (18) | " (30) | 48 | 35900 | 1.00 | 1/6.0 | 6 | 1.1 |
| 6 | — | " (32) | 32 | 12300 | 0.51 | 1/5.0 | 6 | 1.0 |

Note:
*Weight ratio of resin/40% sulfuric acid
** At a discharge rate of 10 hours.

EXAMPLE 7

To 4.5 g of an ethylene copolymer resin consisting 52% of an ethylene unit and 48% of a dimethylaminopropyl acrylamide unit and having number average molecular weight of 15,100 ($[\eta]=0.58$) was added 30 g of 40% dilute sulfuric acid, and the mixture was stirred at 100° C. for 2 hours to prepare a molten viscous liquid comprising the resin dissolved in dilute sulfuric acid.

The viscous liquid was cooled to 70° C. and poured into the same battery box as used in Example 3, and the same multiple anode and cathode grids as used in Example 3 were installed into the battery box. The electrolyte liquor was gelled upon cooling to room temperature. A battery top was fixed to the battery box, and initial charging was conducted to complete a lead accumulator.

The resulting lead accumulator had an EMF of 6V and a capacity of 1.1 Ah at a 10-hour discharging rate.

EXAMPLE 8

Conjugate fibers having a core-sheath structure each having an average diameter of 29 μm were prepared using the same ethylene copolymer resin as used in Example 1 as the sheath and crystalline polypropylene having a melt flow rate of 4 g/10 min as the core at a mixing ratio of 50:50. The fibers were heat adhered at 85° C. to prepare a nonwoven fabric having a void of 74%, a density of 0.24 g/cm², and a thickness of 2.4 mm. Twelve sheets each having a width of 2.5 cm and a length of 2.8 cm were cut out of the nonwoven fabric.

Separately, glass fiber mats were removed from a commercially available small-sized sealed type lead accumulator ("LCR 6V 1.2 Model" manufactured by Matsushita Electric Industrial Co., Ltd.). Each of the 12 sheets of the nonwoven fabric was inserted into each space where the glass mat had been. Then, 28 g of 40% dilute sulfuric acid was poured onto the mat to complete a lead accumulator.

The resulting lead accumulator had an EMF of 6V and a capacity of 1.1 Ah at a 10-hour discharging rate.

REFERENCE EXAMPLE

A commercially available lead accumulator using a glass fiber mat as a carrier for an electrolyte liquor ("LVC 6V 1.2 Model", a small-sized sealed type lead accumulator manufactured by Matsushita Electric Industrial Co., Ltd.) was determined for EMF and capacity. As a result, the EMF was 6V, and the capacity was 1.2 Ah at a 10-hour discharging rate.

As described above, according to the present invention, an electrolyte liquor can easily be fixed by using an ethylene copolymer resin and/or a molding thereof as a fixing carrier or gelling agent for the electrolyte liquor. Thus, the present invention makes it possible to produce a lead accumulator even of a large-size with freedom of design. Further, the lead accumulator according to the present invention is free from any restriction of conditions on handling and transportation.

While the invention has been described in detail and with reference to specific embodiments thereof, it will be apparent to one skilled in the art that various changes and modifications can be made therein without departing from the spirit and scope thereof.

What is claimed is:

1. A lead accumulator using dilute sulfuric acid as an electrolyte liquor, in which the electrolyte liquor is fixed by absorption or impregnation into a porous or swellable ethylene copolymer resin or a molding thereof comprising from 40 to 90% by weight of an ethylene unit and from 10 to 60% by weight of at least one comonomer unit selected from (A) an acrylamide comonomer unit derived from a compound represented by formula (I):

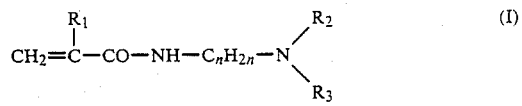

wherein $R_1$ represents a hydrogen atom or a methyl group; $R_2$ and $R_3$ each represents a hydrogen atom or an alkyl group having from 1 to 4 carbon atoms, or they are bonded to each other to form a heterocyclic ring together with the nitrogen atom; and n represents an integer of from 2 to 5 and (B) an ethylenically unsaturated comonomer unit having an ester group and an amino group in the molecule thereof and having an average molecular weight of from 5,000 to 50,000 wherein said comonomer unit having an ester group and an amino group in the molecule thereof is a comonomer unit derived from a compound represented by formula (II):

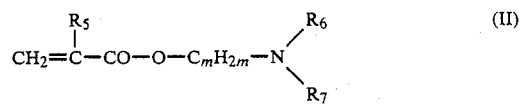

wherein $R_5$ represents a hydrogen atom or a methyl group; $R_6$ and $R_7$ each represents a hydrogen atom or an alkyl group having from 1 to 4 carbon atoms, or they are bonded to each other to form a heterocyclic ring; and m represents an integer of from 2 to 5.

2. A lead accumulator as claimed in claim 1, wherein said heterocyclic ring formed by $R_2$ and $R_3$ is

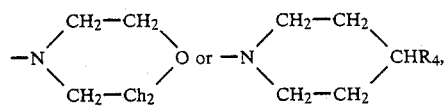

wherein $R_4$ represents a hydrogen atom or an alkyl group having from 1 to 4 carbon atoms.

3. A lead accumulator as claimed in claim I, wherein said compound represented by formula (I) is dimethylaminopropylacrylamide, dimethylamidoporopylmethacrylamide, dimethylaminoethylacrylamide, or dimethylaminoethylmethacrylamide.

4. A lead accumulator as claimed in claim 1, wherein said heterocyclic ring formed by $R_6$ and $R_7$ is

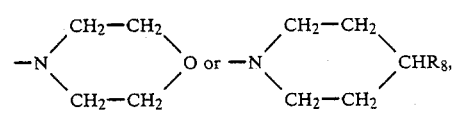

wherein $R_8$ represents a hydrogen atom or an alkyl group having from 1 to 4 carbon atoms.

5. A lead accumulator as claimed in claim 1, wherein said compound represented by formula (II) is dimethylaminoethyl methacrylate, dimethylaminoethyl acrylate, dimethylaminopropyl methacrylate, or dimethylaminopropyl acrylate.

6. A lead accumulator as claimed in claim 1, wherein said resin or molding is a film or sheet.

7. A lead accumulator as claimed in claim 1, wherein said resin or molding is a porous sheet or mat.

8. A lead accumulator as claimed in claim 1, wherein said resin or molding is a conjugate fiber with polypropylene or a woven or nonwoven fabric composed of said conjugate fiber.

9. A lead accumulator as claimed in claim 1, wherein said resin or molding is a powder.

10. A lead accumulator as claimed in claim 1, wherein said absorption of the electrolyte liquor is carried out by mixing the ethylene copolymer resin and the electrolyte liquor and heating the mixture at a temperature of at least the melting point of the resin.

* * * * *